US009751400B2

(12) United States Patent
Tsukahara et al.

(10) Patent No.: US 9,751,400 B2
(45) Date of Patent: Sep. 5, 2017

(54) WAVE-ELIMINATING PLATE SECURING STRUCTURE IN FUEL TANK

(71) Applicant: Yachiyo Industry Co., Ltd., Sayama-shi, Saitama (JP)

(72) Inventors: Shunsuke Tsukahara, Saitama (JP); Takaaki Nakajima, Saitama (JP); Toru Matsuzaki, Saitama (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 14/912,670

(22) PCT Filed: Oct. 7, 2014

(86) PCT No.: PCT/JP2014/076769
§ 371 (c)(1),
(2) Date: Feb. 18, 2016

(87) PCT Pub. No.: WO2015/064315
PCT Pub. Date: May 7, 2015

(65) Prior Publication Data
US 2016/0200192 A1    Jul. 14, 2016

(30) Foreign Application Priority Data
Nov. 1, 2013    (JP) ................................. 2013-228642

(51) Int. Cl.
*B65D 1/40*    (2006.01)
*B60K 15/077*    (2006.01)
(Continued)

(52) U.S. Cl.
CPC ....... *B60K 15/077* (2013.01); *F02M 37/0082* (2013.01); *B60K 2015/0344* (2013.01);
(Continued)

(58) Field of Classification Search
CPC .. B60K 15/03; B60K 15/077; B60K 15/0775; B60K 15/0777; B65D 90/52
(Continued)

(56) References Cited

U.S. PATENT DOCUMENTS 5,506,025 A * 4/1996 Otto ...................... B29C 44/188
428/124
5,678,826 A * 10/1997 Miller ................... B29C 44/188
264/275
(Continued)

FOREIGN PATENT DOCUMENTS

JP    H02-034443    3/1990
JP    2005-170084    6/2005
(Continued)

OTHER PUBLICATIONS

JP 2005-170084 Machine Translation.*
JP 2007-237843 Machine Translation.*
International Search Report, dated Jan. 6, 2015 (Jan. 6, 2015).

*Primary Examiner* — Steven A. Reynolds
*Assistant Examiner* — Javier A Pagan
(74) *Attorney, Agent, or Firm* — Rankin, Hill & Clark LLP (57) ABSTRACT

A wave-eliminating plate securing structure in a fuel tank 1 includes: a wave-eliminating plate configured to be fixed to an inside of a resinous fuel tank and to suppress waving of fuel; and resinous clips each including a weld portion to be welded and fixed to an inner wall of the fuel tank, and an attachment portion to which to attach the wave-eliminating plate. After the clips are welded and fixed at their respective predetermined positions to an inner wall of the fuel tank in advance, the wave-eliminating plate may be inserted into the fuel tank, and attached and fixed to the clips. Thereby, the (Continued)

wave-eliminating plate can be easily fixed at a predetermined position to the inside of the fuel tank with high precision.

1 Claim, 8 Drawing Sheets (51) Int. Cl.
*F02M 37/00* (2006.01)
*B60K 15/03* (2006.01)
(52) U.S. Cl.
CPC ............ B60K 2015/0346 (2013.01); B60K 2015/03467 (2013.01); B60K 2015/03493 (2013.01); B60K 2015/0775 (2013.01)
(58) Field of Classification Search
USPC .................................................. 220/734, 563
See application file for complete search history.

(56) References Cited

U.S. PATENT DOCUMENTS

| | | | | |
|---|---|---|---|---|
| 6,138,859 A * | 10/2000 | Aulph | ............... | B60K 15/03 137/574 |
| 6,146,565 A * | 11/2000 | Keller | ............... | B62D 29/002 264/252 |
| 6,413,611 B1 * | 7/2002 | Roberts | ............... | B62D 29/002 296/193.06 |
| 6,820,923 B1 * | 11/2004 | Bock | ............... | B60R 13/08 181/286 |
| 7,913,814 B2 * | 3/2011 | Duffin | ............... | B60R 13/08 181/196 |
| 8,449,701 B2 * | 5/2013 | Allen | ............... | B60R 13/08 156/79 |
| 2005/0082111 A1 * | 4/2005 | Weber | ............... | B60R 13/08 181/204 |
| 2010/0224440 A1 | 9/2010 | Fujii | | |
| 2011/0057392 A1 * | 3/2011 | Monnet | ............... | B62D 29/002 277/312 |
| 2011/0076435 A1 * | 3/2011 | Tachibana | ............... | B62D 25/081 428/43 |
| 2013/0328349 A1 * | 12/2013 | Lewis | ............... | B60R 13/0815 296/187.02 |
| 2014/0138388 A1 * | 5/2014 | Synnestvedt | ............... | B65D 90/52 220/563 |
| 2014/0197174 A1 * | 7/2014 | Boecker | ............... | B60K 15/067 220/562 |

FOREIGN PATENT DOCUMENTS

| | | | |
|---|---|---|---|
| JP | 2005170084 A | * | 6/2005 |
| JP | 2006-207446 | | 8/2006 |
| JP | 2006-264580 | | 10/2006 |
| JP | 2007-237843 | | 9/2007 |
| JP | 2007237843 A | * | 9/2007 |
| JP | 2009-132365 | | 6/2009 |
| JP | 2013-220704 | | 10/2013 |
| JP | 2013-505161 | | 2/2014 |
| WO | 2007/099691 | | 9/2007 |

* cited by examiner

WAVE-ELIMINATING PLATE SECURING STRUCTURE IN FUEL TANK

TECHNICAL FIELD

The present invention relates to a wave-eliminating plate securing structure in a fuel tank which is configured to fix a wave-eliminating plate for suppressing waving of fuel.

BACKGROUND ART

A structure has been known which is configured to reduce wave sounds of fuel by suppressing waving of the fuel using a wave-eliminating plate fixed to an inside of a resinous fuel tank installed in an automobile or the like. A technique for realizing this structure is described in Patent Literature 1, for example. In this technique, a wave-eliminating plate (an inner skeleton in Patent Literature 1) is directly welded and fixed at multiple positions to an inner wall of a fuel tank.

CITATION LIST

Patent Literature

Patent Literature 1: JP 2013-505161 A

SUMMARY OF INVENTION

Technical Problem

The welding of the wave-eliminating plate during the forming of the fuel tank, however, causes a problem that a highly-skilled technique is needed to weld the wave-eliminating plate, which is a relatively large component, at multiple positions with high precision.

The present invention has been created to solve such a problem. An object of the present invention is to provide a wave-eliminating plate securing structure in a fuel tank which enables a wave-eliminating plate to be easily fixed at a predetermined position to an inside of a fuel tank with high precision.

Solution to Problem

For the purpose of solving the foregoing problem, a wave-eliminating plate securing structure in a fuel tank of the present invention is characterized in that the wave-eliminating plate securing structure includes: a wave-eliminating plate configured to be fixed to an inside of a resinous fuel tank and to suppress waving of fuel; and a clip including a weld portion to be welded and fixed to an inner wall of the fuel tank, and an attachment portion to which to attach the wave-eliminating plate.

Because of such a configuration, after the weld portion of the clip is welded and fixed to the inner wall of the fuel tank in advance, the wave-eliminating plate may be inserted into the post-formed fuel tank, and attached and fixed to the attachment portion of the clip. For this reason, the wave-eliminating plate can be easily fixed at a predetermined position to the inside of the fuel tank with high precision.

In addition, the wave-eliminating plate is characterized by including an engagement portion engageable with a column-shaped portion provided upright to the inside of the fuel tank.

Because of such a configuration, the wave-eliminating plate can be fixed using the column-shaped portion provided upright to the inside of the fuel tank.

Moreover, the wave-eliminating plate is characterized by including a flexible portion therein having flexibility.

Because of such a configuration, the wave-eliminating plate can be more easily fixed since the wave-eliminating plate is flexible at the flexible portion.

Furthermore, the wave-eliminating plate is characterized in that it includes an attachment part to be attached to the attachment portion and an engagement portion engageable with a column-shaped portion provided upright to the inside of the fuel tank, and the flexible portion is formed between the attachment part and the engagement portion.

Because of such a configuration, an attachment error between the attachment part and the engagement portion can be absorbed by the flexible portion.

Advantageous Effects of Invention

A wave-eliminating plate securing structure in a fuel tank according to the present invention makes it possible to easily fix a wave-eliminating plate at a predetermined position to an inside of a fuel tank with high precision.

DESCRIPTION OF EMBODIMENTS

Hereinafter, embodiments of the present invention will be described with reference to the accompanying drawings.
<Configuration of First Embodiment>

Figure 1:
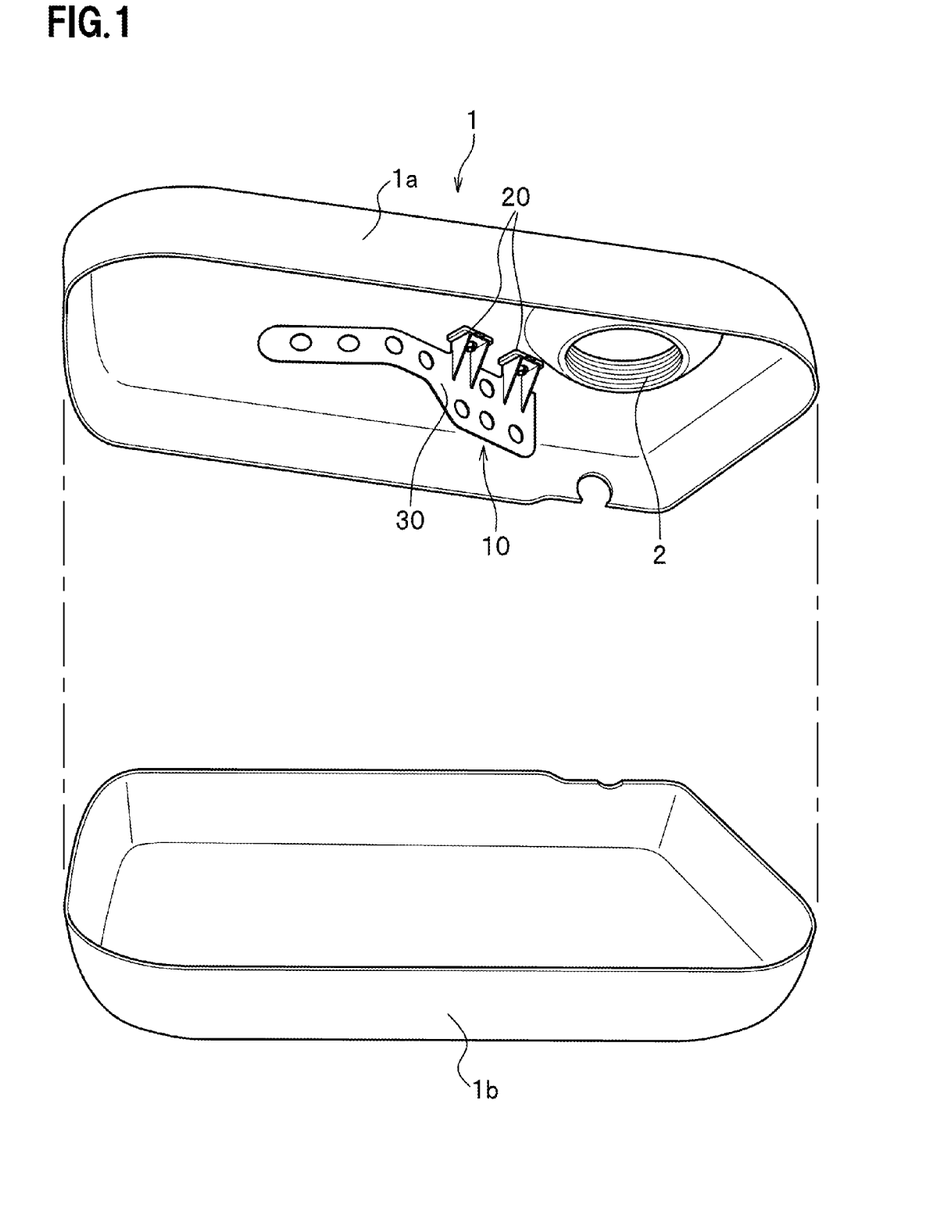
FIG. 1 is an exploded perspective view of a fuel tank, which shows a wave-eliminating plates securing structure in a fuel tank according to a first embodiment of the present invention.

A first embodiment of the present invention will be hereinbelow described with reference to the accompanying drawings. A fuel tank 1 shown in FIG. 1 is made of resin, holds fuel such as gasoline in the inside, and is installed in travelling means such as automobiles, motorbikes and boats.

The fuel tank 1 is of a transversely wide and vertically thin type. The fuel tank 1 is made of thermoplastic resin, and includes a barrier layer. FIG. 1 shows configurations of upper and lower portions 1a, 1b, that is to say, upper and lower halves into which the fuel tank 1 is divided in a thickness direction of the fuel tank 1.

A wave-eliminating plate securing structure 10 for the fuel tank 1 has a structure in which two clips 20, 20 are welded and fixed to a ceiling surface of an inner wall of the upper portion 1a with a predetermined interval in between, and a wave-eliminating plate 30 is attached and fixed to each clip 20 thus fixed.

A pump attachment hole 2 to which to attach a pump (not shown) for pumping fuel out of the tank is formed in and penetrates through the ceiling surface of the inner wall of the upper portion 1a. Each clip 20 is welded and fixed near the pump attachment hole 2. With work for fixing the wave-eliminating plate 30 taken into consideration, it is desirable that each clip 20 be fixed near the pump attachment hole 2.

Figure 2A:
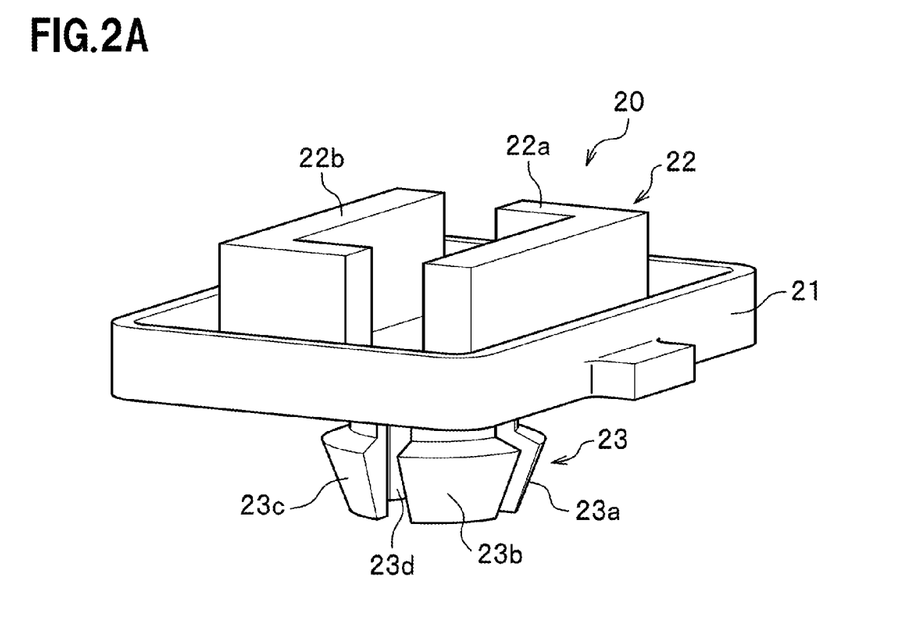
FIG. 2A is a perspective view showing a weld portion of a clip.
Figure 2B:
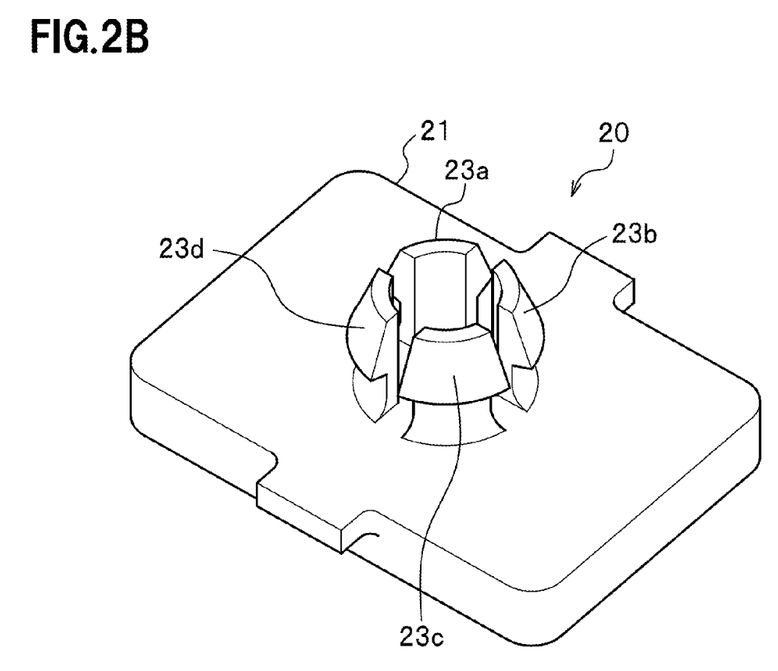
FIG. 2B is a perspective view showing an attachment portion of the clip.

Each clip 20 is made of resin material. Any resin material may be used for the clip 20, as long as the material is weldable to the fuel tank 1. In the embodiment, material which is the same as that of the fuel tank 1 is used for the clip 20. As shown in FIGS. 2A and 2B, each clip 20 has a structure which includes a weld portion 22 projecting from a surface of a thin and rectangular parallelepiped-shaped base portion 21, and an attachment portion 23 projecting from an opposite surface of the base portion 21 from the surface from which the weld portion 22 projects.

The weld portion 22 includes two projecting portions 22a, 22b shaped like the letter L. This projecting weld portion 22 is designed to be heated and thus welded to the ceiling surface of the inner wall of the upper portion 1a (see FIG. 1).

The attachment portion 23 has a structure including multiple (four, in this example) lock claws 23a to 23d which project from the opposite surface of the base portion 21, and which are independently arranged in a circle. The lock claws 23a to 23d each have elasticity and a neck shape. Once the lock claws 23a to 23d receive pressing force directed from their outer peripheral side toward their inner peripheral side, the lock claws 23a to 23d are deformed toward the center of the circle while reducing the diameter of the circle. Once the lock claws 23a to 23d are released from the pressing force, the lock claws 23a to 23d once having reduced the diameter of the circle spread toward their outer peripheral side due to their elastic force, and thus return to their original shapes.

Each clip 20 is welded at a predetermined position to the inner wall of the fuel tank 1, as shown in FIG. 1, when the fuel tank 1 is formed, or is welded at the predetermined position by being put into the fuel tank 1 through the pump attachment hole 2 using a robot mechanism (not shown), after the fuel tank 1 is formed.

Figure 3A:
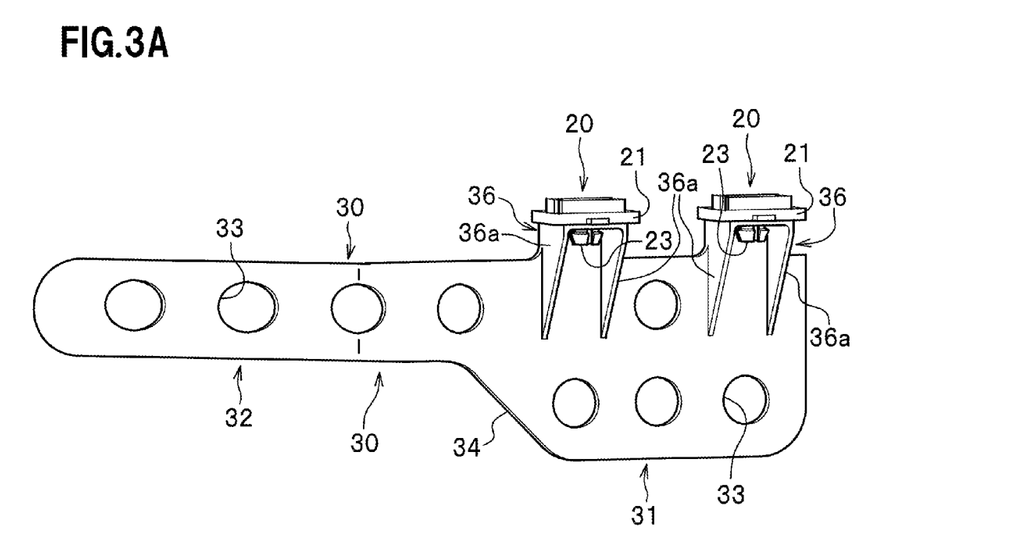
FIG. 3A is a perspective view showing a wave-eliminating plate fixed to the clips.
Figure 3B:
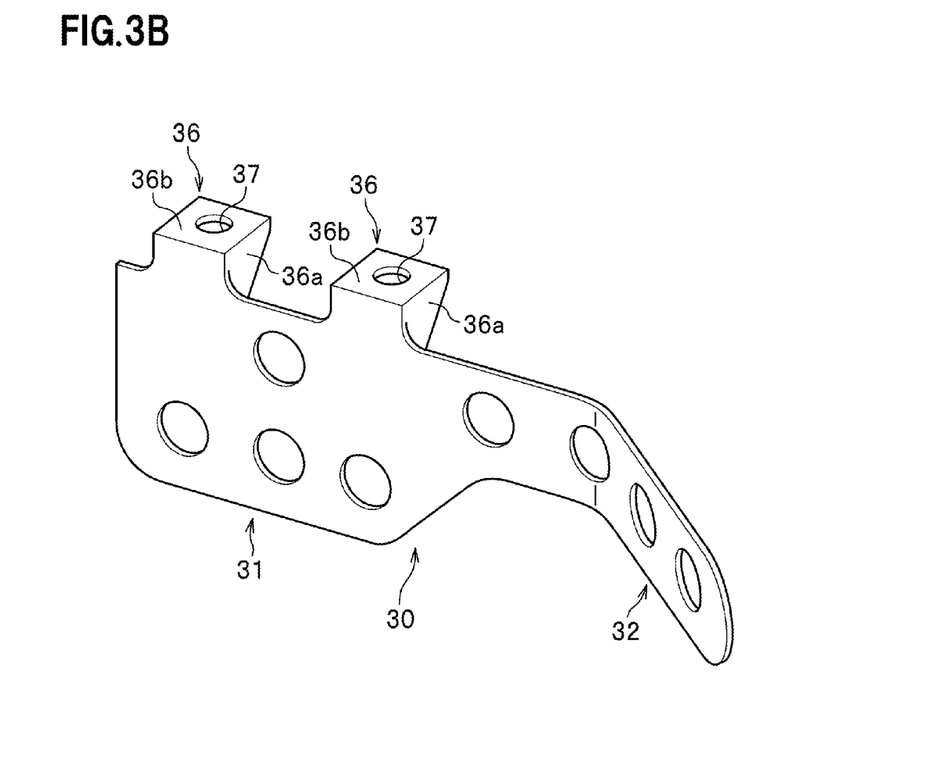
FIG. 3B is a perspective view showing the wave-eliminating plate alone, which is taken from FIG. 3A, in the opposite direction.

As shown in FIG. 3, the wave-eliminating plate 30 is a plate-shaped member for suppressing the fuel from waving in the fuel tank 1. Incidentally, FIG. 3A shows how the wave-eliminating plate 30 is attached and fixed to the clips 20.

The wave-eliminating plate 30 includes a first shape portion 31 with a larger height dimension, a second shape portion 32 with a smaller height dimension, and attachment fixing portions 36, 36. The wave-eliminating plate 30 is made of resin, and is an integrally-formed one. The first shape portion 31 is a component having the attachment fixing portions 36, 36 on upper portion thereof, and configured to be attached to the clips 20. The second shape portion 32 is formed with the same plate thickness as the first shape portion 31 is, and is bent toward one surface side at a predetermined angle.

The first and second shape portions 31, 32 both include multiple round holes 33 formed to penetrate through the first and second shape portions 31, 32. The multiple round holes 33 are configured to suppress the waving of the fuel by allowing a predetermined amount of fuel to pass through the round holes 33 when the fuel swings in response to swinging of the fuel tank 1 in which the wave-eliminating plate 30 is disposed.

Each attachment fixing portion 36 includes a flat surface portion 36b which extends between two support portions 36a, 36a provided upright vertically to an opposite surface of the first shape portion 31. The flat surface portion 36b includes a lock hole 37 formed in the center of the flat surface portion 36b to penetrate through the flat surface portion 36b. The flat surface portion 36b is situated above an upper end of the first shape portion 31.

The lock hole 37 has a diameter slightly smaller than a maximum outer peripheral diameter of the lock claws 23a to 23d of the corresponding clip 20 which are arranged in a circle. Once the wave-eliminating plate 30 is pressed toward the base portion 21 of the clip 20 with the lock hole 37 aligned to tip ends of the lock claws 23a to 23d, the lock hole 37 moves to positions of the necks of the lock claws 23a to 23d while reducing the diameter. Thereafter, the lock claws 23a to 23d spread due to their elastic force to return to their original shapes, and the necks are fitted to the lock hole 37. In other words, a state is established in which each attachment fixing portion 36 of the wave-eliminating plate 30 is fixed to the attachment portion 23 of the corresponding clip 20.

<Procedure of First Embodiment>

Next, descriptions will be provided for a procedure for attaching and fixing the wave-eliminating plate 30 to the inner wall of the fuel tank 1.

Figure 4A:
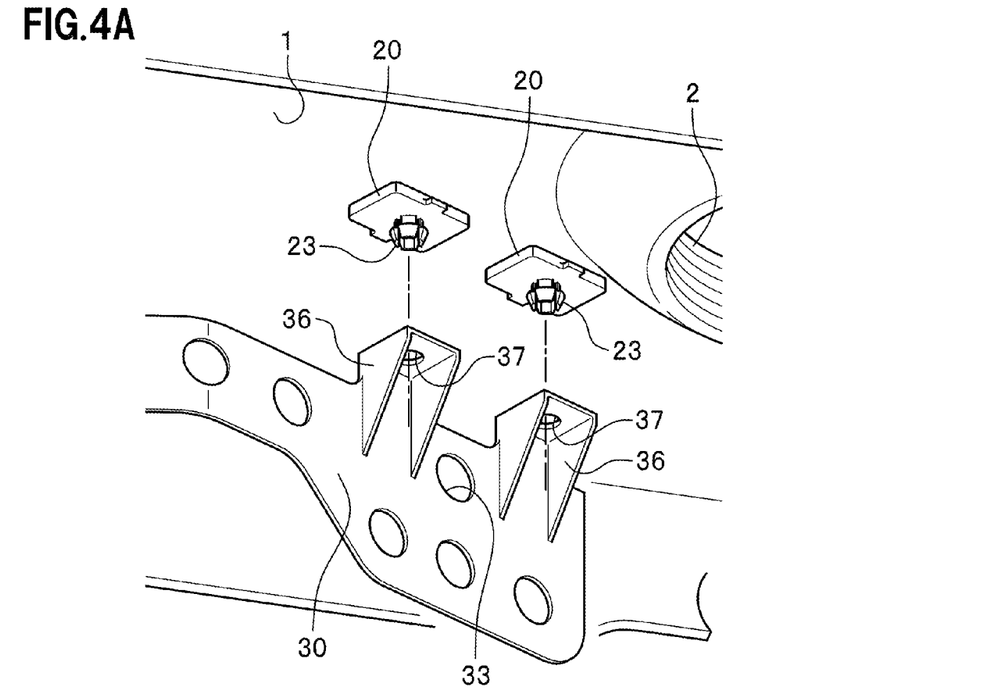
FIG. 4A is a perspective view showing how the wave-eliminating plate is aligned to the clips welded to an inner surface of the fuel tank

To begin with, as shown in FIG. 4A, the two clips 20 are welded to the inner wall of the fuel tank 1 at their respective predetermined positions near the pump attachment hole 2.

Thereafter, the wave-eliminating plate 30 is inserted into the fuel tank 1 through the pump attachment hole 2. As shown in FIG. 4A, the lock hole 37 of each attachment fixing portion 36 of the wave-eliminating plate 30 is aligned to the tip ends of the lock claws 23a to 23d of the attachment portion 23 of the corresponding clip 20.

Figure 4B:
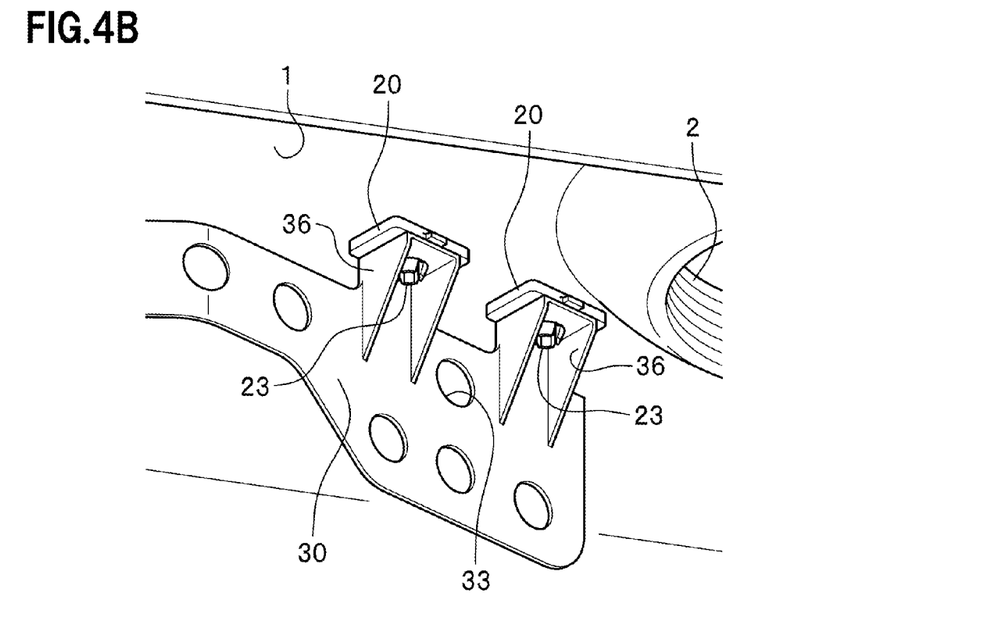
FIG. 4B is a perspective view showing how the wave-eliminating plate is fixed to the clips.

Subsequently, once the wave-eliminating plate 30 is pressed toward the base portions 21 of the clips 20, each lock hole 37 is fitted to the corresponding lock claws 23a to 23d, and the necks of the lock claws 23a to 23d are thus fitted to the lock hole 37, as shown in FIG. 4B.

Thereby, the attachment fixing portion 36 is fixed to each attachment portion 23. For this reason, the wave-eliminating plate 30 is fixed to each clip 20 welded to the inner wall of the fuel tank 1. Accordingly, the wave-eliminating plate 30 is disposed at the predetermined position inside the fuel tank 1.

<Effect of First Embodiment>

As described above, the wave-eliminating plate securing structure 10 for the fuel tank 1 according to the first embodiment has the configuration which includes: the wave-eliminating plate 30 configured to be fixed to the inside of the resinous fuel tank 1 and to suppress the waving of the fuel; and at least two resinous clips 20 each including the weld portion 22 to be welded and fixed to the inner wall of the fuel tank 1, and the attachment portion 23 to which to attach the wave-eliminating plate 30.

Because of this configuration, after the clips 20 are welded and fixed at their respective predetermined positions to the inner wall of the fuel tank in advance, the wave-eliminating plate 30 may be inserted into the fuel tank 1, and attached and fixed to the clips 20. Thereby, the wave-eliminating plate 30 can be easily fixed at the predetermined position to the inside of the fuel tank 1 with high precision.

<Configuration of Second Embodiment>

Figure 5:
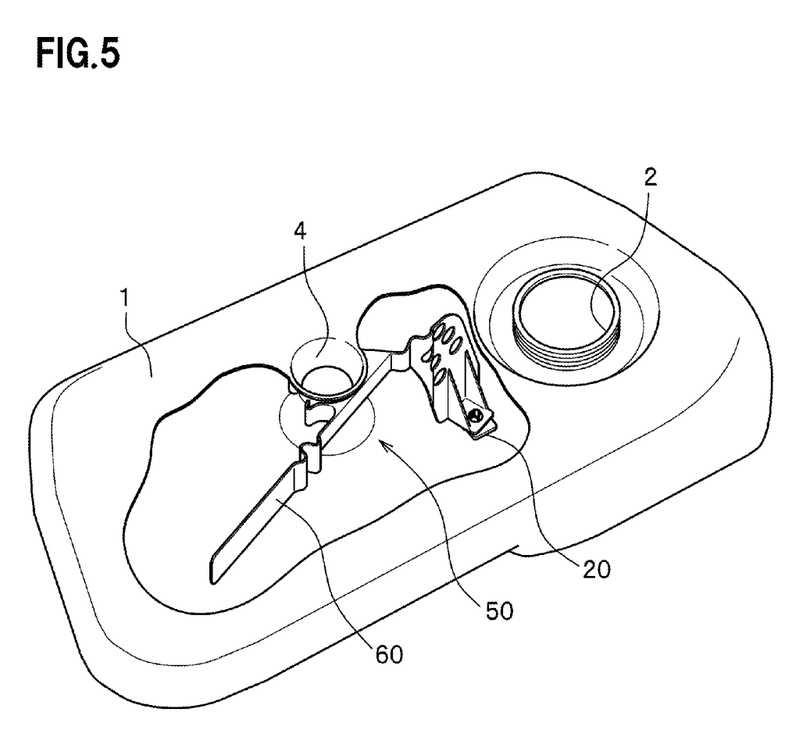
FIG. 5 is a perspective view showing a wave-eliminating plate securing structure in the fuel tank according to a second embodiment of the present invention with the inside made visible from above through the fuel tank.

Next, a second embodiment of the present invention will be described with reference to the accompanying drawings. FIG. 5 is a perspective view showing a configuration thereof with the inside made visible from above through the fuel tank 1.

A wave-eliminating plate securing structure 50 according to the second embodiment has a structure in which: one clip 20 described above is welded and fixed at a predetermined position to an inner bottom surface of the fuel tank 1; and a wave-eliminating plate 60 is attached and fixed to both the thus-fixed clip 20 and a column-shaped portion 4 provided upright to the inside of the fuel tank 1.

The column-shaped portion 4 is a column-shaped part connected to the bottom and ceiling surfaces of the fuel tank 1. No specific restriction is imposed on the shape of the column-shaped portion 4. In this embodiment, however, the plan cross section of the column-shaped portion 4 is circular. The column-shaped portion 4 can increase deformation resistance and strength of the fuel tank 1. Incidentally, the "column-shaped portion" in the scope of claims does not have to be connected to the bottom and ceiling surfaces, and may be the column-shaped part provided upright to the inner surface of the fuel tank 1.

In order to make the wave-eliminating plate 60 easy to put into and attach to the fuel tank 1 as in the case of the first embodiment, it is desirable that the clip 20 be situated on the bottom surface of the fuel tank 1 and near the pump attachment hole 2.

Figure 6A:
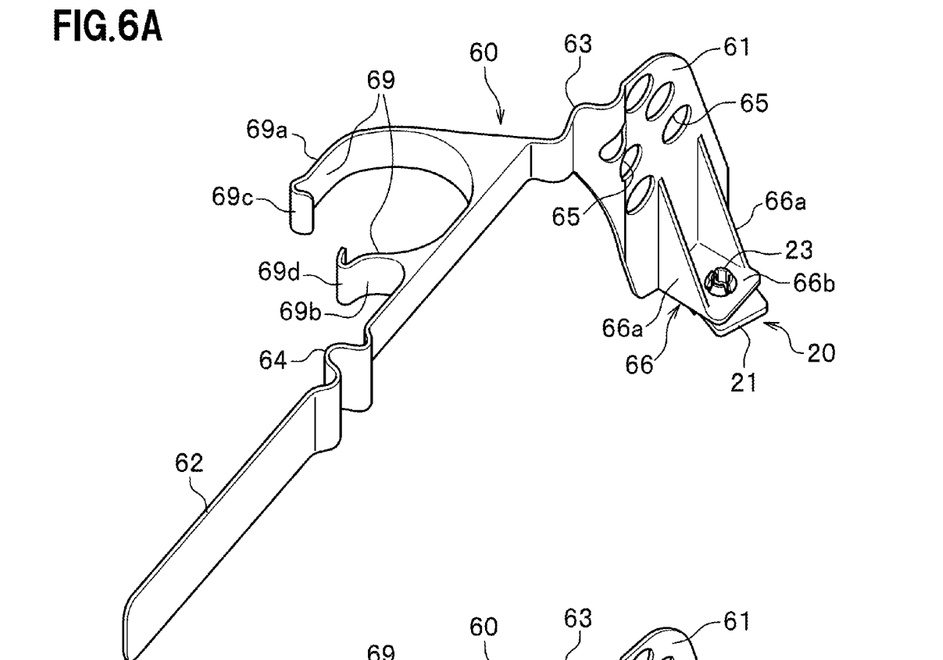
FIG. 6A is a perspective view showing a wave-eliminating plate fixed to the clips.
Figure 6B:
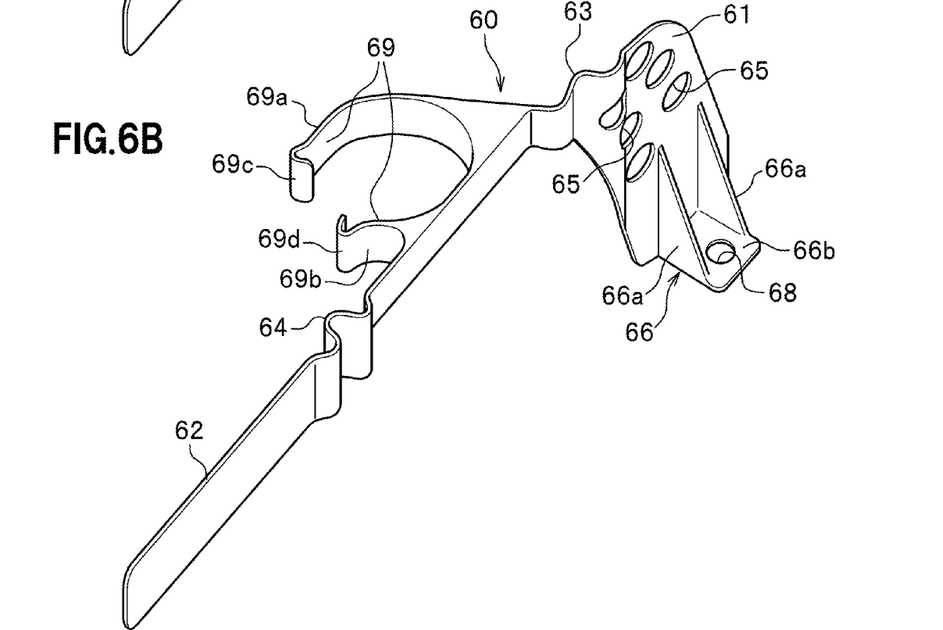
FIG. 6B is a perspective view showing only the wave-eliminating plate shown in FIG. 6A.

The wave-eliminating plate 60 is configured as shown in FIGS. 6A and 6B. FIG. 6A shows how the wave-eliminating plate 60 is attached and fixed to the clip 20, and FIG. 6B shows only the wave-eliminating plate 60 shown in FIG. 6A.

The wave-eliminating plate 60 includes a first shape portion 61, a second shape portion 62, a first flexible portion 63, a second flexible portion 64, an attachment fixing portion 66 and an engagement portion 69.

The first shape portion 61 is shaped like a plate, and an attachment fixing portion 66 is integrally formed on a lower end of the first shape portion 61 at the side of one surface of the first shape portion 61. The first shape portion 61 includes round holes 65 formed in the first shape portion 61 to penetrate through the first shape portion 61. The second shape portion 62 is provided extending sideways from an upper end of the first shape portion 61. A height dimension of the second shape portion 62 is smaller than that of the first shape portion 61.

The first flexible portion 63 is formed in a boundary portion between the first and second shape portions 61, 62, and has a wavy shape. The second flexible portion 64 is formed near the center of the second shape portion 62, and has a corrugated shape.

The attachment fixing portion 66 is attached and fixed to the attachment portion 23 of the clip 20 fixed to the bottom surface of the fuel tank 1. The attachment fixing portion 66 includes a flat surface portion 66b which extends between two support portions 66a, 66a provided upright vertically to an opposite surface of the first shape portion 61. The flat surface portion 66b includes a lock hole 68 formed in the center of the flat surface portion 66b to penetrate through the flat surface portion 66b. Incidentally, the attachment fixing portion 66 corresponds to an "attachment part" of a wave-eliminating plate configured to be attached to an attachment portion, which is recited in a claim.

The lock hole 68 is configured to fix the first shape portion 61 of the wave-eliminating plate 60 to the clip 20. To put it concretely, once the wave-eliminating plate 60 is pressed toward the base portion 21 of the clip 20 with the lock hole 68 aligned to tip ends of the lock claws 23a to 23d (see FIG. 4A), the lock hole 68 moves to positions of the necks of the lock claws 23a to 23d, and the necks are fitted to the lock hole 68. Thereby, the attachment fixing portion 66 of the wave-eliminating plate 60 is fixed to the attachment portion 23 of the clip 20, and the first shape portion 61 of the wave-eliminating plate 60 is placed upright on the bottom portion of the fuel tank 1 with the assistance of the clip 20.

Figure 7:
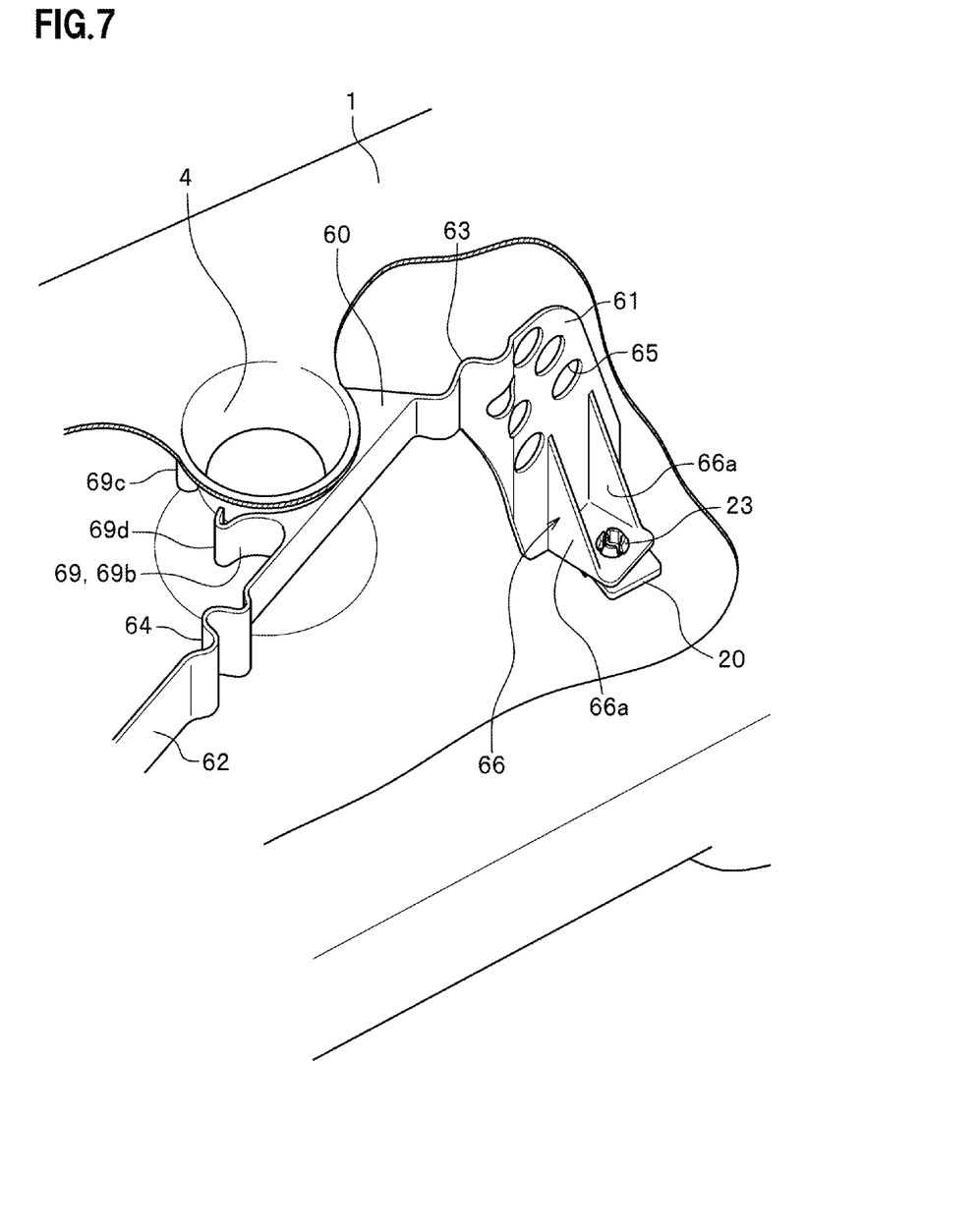
FIG. 7 is a magnified perspective view showing how the wave-eliminating plate is fixed to a column-shaped portion and the clip inside the fuel tank.

The engagement portion 69 is configured to be brought into engagement with the column-shaped portion 4 of the fuel tank 1, as shown in FIG. 7. The engagement portion 69 includes: first and second arm portions 69a and 69b each shaped like an arc in a plan view; and folded portions 69c, 69d respectively formed on tip ends of the first and second arm portions 69a, 69b.

In a base end of the second shape portion 62, the first arm portion 69a extends from an opposite surface of the second shape portion 62 while shaped like an arc in a plan view. The curvature of the first arm portion 69a is almost equal to that of an outer peripheral surface of the column-shaped portion 4. The folded portion 69c folded while curving inward is formed on a tip end of the first arm portion 69a.

Between the first arm portion 69a and the second flexible portion 64, the second arm portion 69b extends from the opposite surface of the second shape portion 62 while shaped like an arc in a plan view. The curvature of the second arm portion 69b is almost equal to that of the outer peripheral surface of the column-shaped portion 4. The overall length of the second arm portion 69b is shorter than that of the first arm portion 69a. The folded portion 69d folded while curving inward is formed on a tip end of the second arm portion 69b. Incidentally, the configuration of the engagement portion 69 is not limited to the foregoing one. The engagement portion 69 may be formed appropriately depending on the positions and the like of the clip 20 and the column-shaped portion 4.

The distance between the folded portions 69c, 69d is set less than the outer diameter of the column-shaped portion 4. For this reason, once the column-shaped portion 4 is inserted into the engagement portion 69 through an interstice between the folded portions 69c, 69d, the first and second arm portions 69a, 69b are spread wide open in a direction in which the first and second arm portions 69a, 69b become farther away from each other. Thereafter, however, the first and second arm portions 69a, 69b hold and fix the column-shaped portion 4 in between due to their resilience. Furthermore, the provision of the engagement portion 69 with the folded portions 69c, 69d makes the engagement portion 69 be easily brought into engagement with the column-shaped portion 4, because the outer peripheral surface of the column-shaped portion 4 can be smoothly moved over the folded portions 69c, 69d.

<Procedure of Second Embodiment>

Next, descriptions will be provided for a procedure for attaching and fixing the wave-eliminating plate 60 to the inner wall of the fuel tank 1.

To begin with, as shown in FIG. 5, the single clip 20 is welded to the inner bottom surface of the fuel tank 1 at a predetermined position near the pump attachment hole 2.

Thereafter, the wave-eliminating plate 60 is inserted into the fuel tank 1 through the pump attachment hole 2. While doing so, if the wave-eliminating plate 60 is not easily put therein through the pump attachment hole 2, the wave-eliminating plate 60 is inserted into the pump attachment hole 2 with the second shape portion 62 bent by use of the first and second flexible portions 63, 64 to be formed into a shape which makes it easy to put the wave-eliminating plate 60 into the pump attachment hole 2. After the insertion, the lock hole 68 of the attachment fixing portion 66 of the wave-eliminating plate 60 is aligned to the tip ends of the lock claws 23a to 23d of the attachment portion 23 of the clip 20 (see FIG. 6A).

Thereafter, once the wave-eliminating plate 60 is pressed toward the base portion 21 of the clip 20, the lock hole 68 is fitted to the lock claws 23a to 23d, and the necks of the lock claws 23a to 23d (see FIG. 2) are fitted to the lock hole 68. Thereby, the attachment fixing portion 66 is attached and fixed to the attachment portion 23. Thus, an end of the wave-eliminating plate 60 is attached to the inner wall of the fuel tank 1 with the assistance of the clip 20.

Subsequently, as shown in FIG. 7, the engagement portion 69 of the wave-eliminating plate 60 is brought into engagement with the column-shaped portion 4 inside the fuel tank 1. If a second interval between the attachment fixing portion 66 and the engagement portion 69 of the wave-eliminating plate 60 is shorter than a first interval between the attachment portion 23 of the clip 20 and the column-shaped portion 4 inside the fuel tank 1, the engagement portion 69 can be appropriately brought into engagement with the column-shaped portion 4 by stretching the first flexible portion 63 of the wave-eliminating plate 60 to make the second interval equal to the first interval.

On the other hand, if the second interval is longer than the first interval, the engagement portion 69 can be appropriately brought into engagement with the column-shaped portion 4 by shortening the first flexible portion 63 to make the second interval equal to the first interval.

It should be noted that the arrangement of the wave-eliminating plate 60 inside the fuel tank 1 may start with any of the attachment and fixation of the attachment fixing portion 66 to the clip 20 and the engagement of the engagement portion 69 with the column-shaped portion 4.

<Effect of Second Embodiment>

As described above, the wave-eliminating plate securing structure 50 for the fuel tank 1 according to the second embodiment includes: the wave-eliminating plate 60 configured to be fixed to the inside of the resinous fuel tank 1 and to suppress the waving of the fuel; and the resinous clip 20 including the weld portion 22 to be welded and fixed to the inner wall of the fuel tank 1, and the attachment portion 23 to which to attach the attachment fixing portion 66 of the wave-eliminating plate 60 at the one end of the wave-eliminating plate 60. Furthermore, the wave-eliminating plate securing structure 50 has the configuration in which the wave-eliminating plate 60 includes the engagement portion 69 engageable with the column-shaped portion 4 provided upright to the inside of the fuel tank 4.

Because of this configuration, the weld portion 22 of the clip 20 is welded and fixed at the predetermined position to the inner wall of the fuel tank 1. Thereafter, the wave-eliminating plate 60 is inserted into the fuel tank 1 through the pump attachment hole 2 of the fuel tank 1. Afterward, the attachment fixing portion 66 of the wave-eliminating plate 60 at the one side of the wave-eliminating plate 60 is attached and fixed to the attachment portion 23 of the clip 20, and the engagement portion 69 of the wave-eliminating plate 60 at the opposite side of the wave-eliminating portion 60 is brought into fitting engagement with the column-shaped portion 4.

In this respect, the attachment and fixation of the attachment fixing portion 66 at the side of the one end of the wave-eliminating plate 60 to the clip 20 can be achieved only by fitting the attachment fixing portion 66 to the clip 20. Furthermore, the engagement of the engagement portion 69 of the wave-eliminating plate 60 with the column-shaped portion 4 can also be achieved only by fitting the engagement portion 69 to the column-shaped portion 4. For these reason, the wave-eliminating plate 60 can be easily fixed and disposed at the predetermined position to the inside of the fuel tank 1 with high precision.

According to the second embodiment, the engagement portion 69 can be fitted using the column-shaped portion 4 which is provided for the purpose of increasing deformation resistance and strength of the fuel tank 1. Furthermore, since the column-shaped portion 4 is connected to the bottom and ceiling surfaces of the fuel tank 1, the engagement portion 69 can be fixed stably.

The wave-eliminating plate 60 is provided with the first and second flexible portions 63, 64. For this reason, the wave-eliminating plate 60 can be easily put through the pump attachment hole 2 by bending the wave-eliminating plate 60 using the first and second flexible portions 63, 64 into a shape which makes it easy to put the wave-eliminating plate 60 through the pump attachment hole 2 whose inlet is narrow.

In addition, the wave-eliminating plate 60 includes the first flexible portion 63 provided between the attachment fixing portion 66 and the engagement portion 69. For this reason, if the second interval between the attachment fixing portion 66 and the engagement portion 69 of the wave-eliminating plate 60 is not equal to the first interval between the attachment portion 23 of the clip 20 welded to the inner wall of the fuel tank 1 and the column-shaped portion 4, the second interval in the wave-eliminating plate 60 can be made equal to the first interval in the fuel tank 1 by expanding and contracting (adjusting) the first flexible portion 63. Thereby, the wave-eliminating plate 60 can be attached and fixed to the attachment portion 23 of the clip 20 and the column-shaped portion 4 in an appropriate condition.

<Modification of Second Embodiment>

Figure 8:
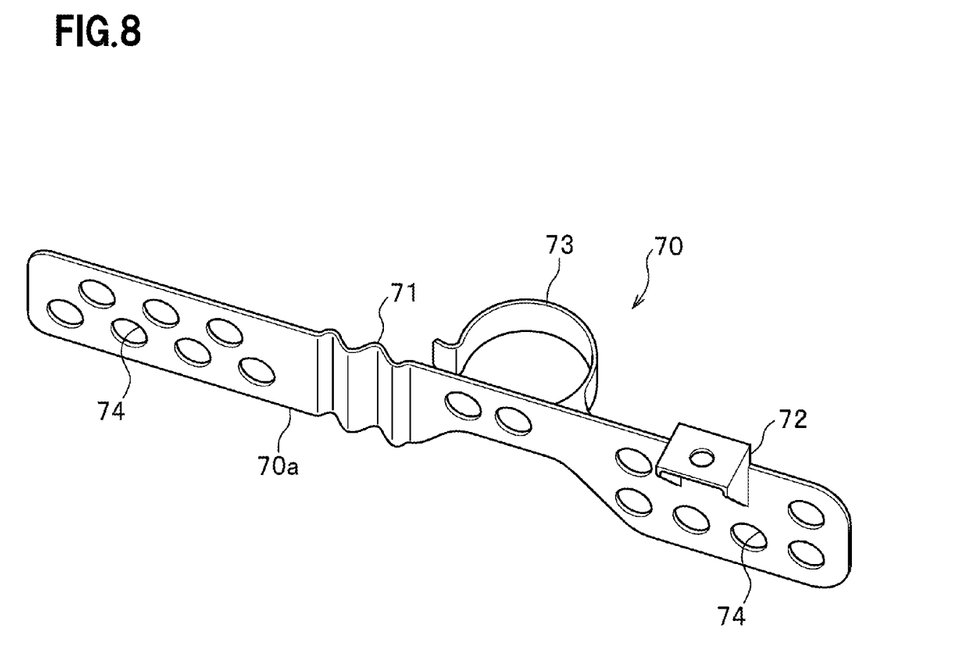
FIG. 8 is a perspective view showing a configuration of the wave-eliminating plate including a flexible portion as a modification of the second embodiment.

As shown in FIG. 8, the above-described wave-eliminating plate 60 may be replaced with a wave-eliminating plate 70 including one flexible portion 71. The wave-eliminating plate 70 includes a main body portion 70a including the flexible portion 71 provided in the middle of the main body portion 70a, an attachment fixing portion 72, and an engagement portion 73. The main body portion 70a includes multiple round holes 74 formed in the main body portion 70a to penetrate through the main body portion 70a, and is shaped like an elongated rectangle. The attachment fixing portion 72 is provided at the side of one end of the main body portion 70a. The engagement portion 73 is provided between the attachment fixing portion 72 and the flexible portion 71.

In the second embodiment described above, the flexible portions are provided to the two respective ends of the engagement portion 69. However, as in the case of this modification, the flexible portion 71 may be provided only to a tip end side of the engagement portion 73. Otherwise, albeit a concrete illustration is omitted, a flexible portion may be provided only between the engagement portion 73 and the attachment fixing portion 72.

The embodiments and modification have been described above. Design changes may be made to the embodiments and modification depending on the necessity within a scope not departing from the gist of the present invention.

REFERENCE SIGNS LIST

1: fuel tank
2: pump attachment hole
4: column-shaped portion
1a: upper portion of fuel tank
1b: lower portion of fuel tank
10, 50: wave-eliminating plate securing structure
20: clip
21: base portion
22: weld portion
23: attachment portion
23a to 23d: lock claw
30, 60, 70: wave-eliminating plate
31, 61: first shape portion
32, 62: second shape portion
33, 65, 74: round hole
36, 66, 72: attachment fixing portion
36b, 66b: flat surface portion
37, 68: lock hole
70a: main body portion
63: first flexible portion
64: second flexible portion
69, 73: engagement portion
71: flexible portion

The invention claimed is:

1. A wave-eliminating plate securing structure in a fuel tank, comprising:
   a wave-eliminating plate configured to be fixed to an inside of a resinous fuel tank and to suppress waving of fuel;
   a clip, said clip including a weld portion to be welded and fixed to an inner wall of the fuel tank, and an attachment portion to which the wave-eliminating plate may be attached; and
   an engagement portion formed on the wave-eliminating plate and engageable with a column-shaped portion connected to bottom and ceiling surfaces of the inside of the fuel tank,
   wherein the wave-eliminating plate is fixed to the inside of the fuel tank by: at one side thereof, the wave-eliminating plate being attached to the clip by pressing the wave-eliminating plate toward the clip; and at an opposite side thereof, the wave-eliminating plate being brought into engagement with the column-shaped portion, wherein the engagement portion holds the column-shaped portion due to resilience thereof, and
   wherein the wave-eliminating plate includes a flexible portion formed between an attachment part to be attached to the attachment portion and the engagement portion, said flexible portion being formed so as to be is expandable and contractible in a longitudinal direction of the wave-eliminating plate.

* * * * *